United States Patent
Jensen et al.

(10) Patent No.: US 7,693,867 B2
(45) Date of Patent: Apr. 6, 2010

(54) MODEL REFERENCING METHOD AND APPARATUS

(75) Inventors: Robert Jensen, Berkeley, CA (US); Andrew Witkin, Oakland, CA (US)

(73) Assignee: Pixar, Emeryville, CA (US)

(*) Notice: Subject to any disclaimer, the term of this patent is extended or adjusted under 35 U.S.C. 154(b) by 860 days.

(21) Appl. No.: 10/766,758

(22) Filed: Jan. 27, 2004

(65) Prior Publication Data

US 2004/0243597 A1 Dec. 2, 2004

Related U.S. Application Data

(60) Provisional application No. 60/470,948, filed on May 14, 2003.

(51) Int. Cl.
*G06F 7/00* (2006.01)
*G06F 17/00* (2006.01)
(52) U.S. Cl. .................. 707/104.1; 707/200; 703/6; 345/473; 345/419
(58) Field of Classification Search .............. None
See application file for complete search history.

(56) References Cited

U.S. PATENT DOCUMENTS

| | | | | |
|---|---|---|---|---|
| 5,907,704 A | * | 5/1999 | Gudmundson et al. ...... | 717/100 |
| 5,970,252 A | * | 10/1999 | Buxton et al. ............... | 717/166 |
| 6,049,805 A | * | 4/2000 | Drucker et al. .............. | 707/102 |
| 6,184,901 B1 | * | 2/2001 | Silva et al. ................... | 345/474 |
| 6,285,369 B1 | * | 9/2001 | Kross et al. .................. | 345/419 |
| 6,377,263 B1 | * | 4/2002 | Falacara et al. ............. | 345/473 |
| 6,385,563 B1 | * | 5/2002 | Vora et al. .................... | 703/6 |
| 6,510,516 B1 | * | 1/2003 | Benson et al. ............... | 713/167 |
| 6,604,068 B1 | * | 8/2003 | Bukowski et al. ............ | 703/22 |
| 6,683,622 B2 | * | 1/2004 | Arsenault .................... | 345/666 |
| 6,768,486 B1 | * | 7/2004 | Szabo et al. ................. | 345/420 |
| 7,173,623 B2 | * | 2/2007 | Calkins et al. .............. | 345/473 |
| 2001/0035873 A1 | * | 11/2001 | Easter ......................... | 345/632 |
| 2003/0085911 A1 | * | 5/2003 | Arsenault .................... | 345/666 |

OTHER PUBLICATIONS

International Search Report PCT/US04/015360.

\* cited by examiner

*Primary Examiner*—John R Cottingham
*Assistant Examiner*—Michael Pham
(74) *Attorney, Agent, or Firm*—Townsend and Townsend and Crew LLP

(57) ABSTRACT

A method for a computer system includes opening a first file describing a first object in an object environment, determining a reference for a second object, wherein the second object includes a plurality of attributes, receiving a second file describing the second object from a storage system; in response to the reference, and opening the second file describing the second object in the object environment, determining a modified value for an attribute from the plurality of attributes for the second object, and including in the first file the reference for the second object and the modified value for the attribute, wherein the second object is not stored in the first file.

21 Claims, 5 Drawing Sheets

MODEL REFERENCING METHOD AND APPARATUS

CROSS-REFERENCES TO RELATED APPLICATIONS

The present application incorporates by reference for all purposes and claims priority to Provisional Application No. 60/470,948, filed May 14, 2003.

BACKGROUND OF THE INVENTION

The present invention relates to computer animation. More specifically, the present invention relates to management of animation objects.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarves" and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1932). Subsequently, these techniques were refined by animators such as Ray Harryhausen for movies including "The Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and rendering software now known as RenderMan®. RenderMan® renders images based upon geometric scene descriptors including references to object models. Between different scenes, the objects are typically repositioned, or animated by an animator. To specify the animation of the object, the animator uses one or more object rigs to manipulate the object in time.

One method for creating an object is via creating an object from scratch. For example, the user specifies an object from the ground-up. Such a technique is of course inefficient, as often objects have portions that could be reused by other users for other objects or the user could use portions of other users' objects.

One method for creating an object, not necessarily in the prior art, is with the use of templates as starting points for customization. For example, to create an object, a user may retrieve a template for the object, customize it, and then save the customized object. As another example, a user may use templates of more than one object as a starting point to create a larger object, and then customize the objects. In such cases, after customization, the objects that are specified by the templates are stored as part of the created object.

Disadvantages to these approaches include that subsequent changes to the original model template, after the object template was used, are not propagated to the created object. Instead, any changes to the object template would have to be manually propagated to the objects that used the template. Additionally, disadvantages include that users could customize an object so significantly that it would effectively be useless to other users.

The inventors of the present invention have determined that improved methods for crating and updating objects are needed without the drawbacks illustrated above.

BRIEF SUMMARY OF THE INVENTION

The present invention relates to computer animation. More specifically, the present invention relates to referencing of models in a scene.

Model referencing allows building of computer graphics models that incorporate re-usable components, with the ability to customize the components, and to automatically receive updates as the original components are modified.

Character models are complex and unique, but have many features in common. However, the inventors have determined that it was very inefficient to duplicate and independently maintain these common features. Model referencing allows the common elements to be shared, but still allows the unique features of each character to be captured.

The effort to build shared components, such as a hand, face, or body object ("rig"), is amortized over many characters. Fixes and updates to the shared rig propagate to all characters automatically. It is much easier to maintain a standardized animator interface, facilitating animators' training and working efficiency. The quality and complexity of background characters, which must be built under stringent budget constraints, is far higher than it was when each character was made from scratch or from a template.

Customizations to shared model components are stored as overrides that describe the changes to those components from their original state. Each time a new version of the shared component is brought in, the stored overrides are re-applied to the component, so that the model both receives the updates and retains its customizations. The author of a shared component selects which internal parts will be exposed for customization when models reference the component, providing an API for customization, and making the re-application of overrides more robust.

There are several aspects to working with shared model components: creating or authoring a shared component, using or referencing a shared component, and re-merging and applying parameter overrides.

Authoring a shared component: A shared component consists of a conventionally constructed model or model fragment, augmented with additional information that determines how that model will appear when referenced by other models. Objects may be shared as public, indicating that the object's attributes will be accessible for editing by the author of the model that references the shared component. By default, objects are private, meaning they will be invisible and their attributes cannot be edited. In addition, objects which have been marked public may have a path marker set. The path marker is used to control the way objects are identified for the purpose of applying overrides.

Referencing a shared component: The author of a model that references a shared component (which may itself by used recursively as a shared component of other models) first declares a new instance of the shared component, specifying where in the model's hierarchic structure the new instance will be attached. The file containing the definition of the component is located and opened for reading only, and the model it contains is copied into the local model. The author continues working on the model. Referenced objects that had been marked public are visible and can be edited in the usual way. These edits are stored as overrides that are saved as part of the local model, and can be re-applied when a new version of the referenced model is obtained. Referenced objects that had been marked private are hidden and cannot be edited.

Re-merging and applying overrides. When a new version of a shared component is released, the author of a model that references that component can merge in the new version. The merge process proceeds as follows: the file containing the shared component is opened read only. In some embodiments, all the new objects in the shared component are copied into the current local model, alongside the old foreign objects that had been produced by the previous merge operation. In other embodiments, not all old foreign objects are saved.

Each foreign public object is located using the specification of its path, in one embodiment. If the object is not located, the user is warned and given the opportunity to fix the local model so that the object can be found. Overrides are then applied to the object. In some cases, the new and old copies of the object are compared as an aid to applying the override. When all the overrides have been applied, local objects that refer to foreign objects are modified to refer to the new ones, and finally the old foreign objects can be deleted.

According to one aspect of the invention, a method for a computer system is described. One technique includes opening a first file describing a first object in an object environment, determining a reference for a second object, wherein the second object includes a plurality of attributes. Another technique also includes receiving a second file describing the second object from a storage system; in response to the reference, and opening the second file describing the second object in the object environment. The process may also include determining a modified value for an attribute from the plurality of attributes for the second object, and including in the first file the reference for the second object and the modified value for the attribute. In various embodiments, the second object is not stored in the first file.

According to yet another aspect of the invention, a computer system including an object environment is disclosed. One system includes a storage system configured to store a first file describing a first object and a second file describing a second object, wherein the storage system is also configured to provide the first file in response to a first reference and configured to provide the second file in response to a second reference. The system may also include a processor coupled to the storage system, wherein the processor is configured to open the first file, wherein the processor is configured to determine the second reference in response to the first file, wherein the processor is configured to determined a value of an attribute from the second object in response to the first file, wherein the processor is configured to provide the second reference to the storage system, wherein the processor is configured to receive the second file from the storage system, wherein the processor is configured to open the second file, and wherein the processor is configured to override a default value of the attribute from the second object with the value. In various embodiments, a model of the second object is not stored in the first file.

According to one aspect of the invention, a computer program product for a computer system including a processor coupled to a server is taught. Various computer code includes code that directs the processor to allow a user to create a first object in an object environment, code that directs the processor to determine a reference to a second object in the server, wherein the second object includes a plurality of attributes, and code that directs the processor to create an instance of the second object in the object environment. Various embodiments also include code that directs the processor to determine a modified value for an attribute from the plurality of attributes for the second object, and code that directs the processor to override a default value for the attribute with the modified value. In some embodiments, the attribute of second object stored in the server is not modified. The computer codes typically reside on a tangible media such as a computer hard drive, network drive, optical media (CD-ROM, DVD), and the like

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
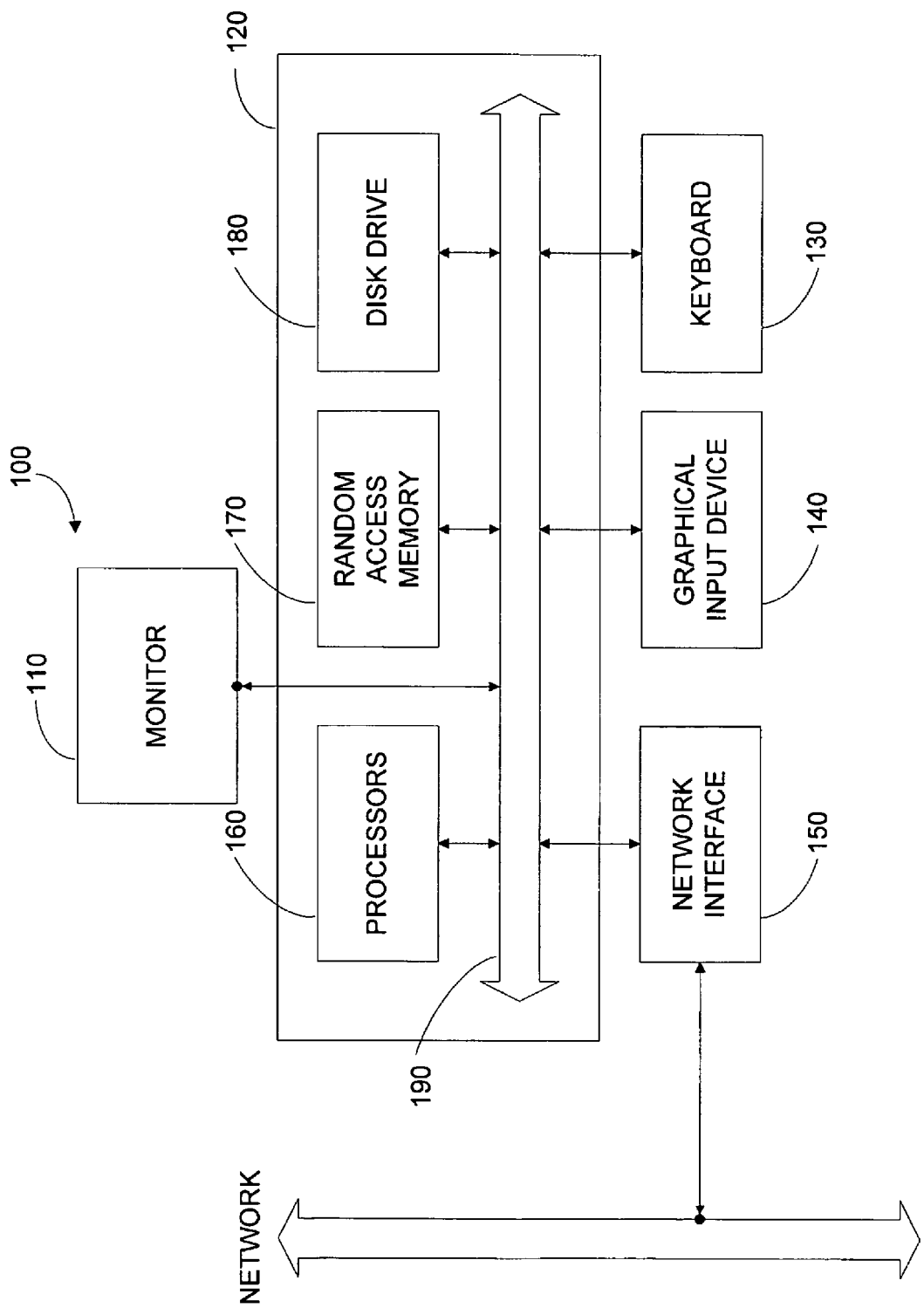
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, a wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, scene descriptor files, object data files, shader descriptors, a rendering engine, output image files, texture maps, displacement maps, object creation environments, animation environments, asset management systems, databases and database management systems, and the like. Other types of tangible medium include floppy disks, removable hard disks, optical storage media such as CO-ROMS, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
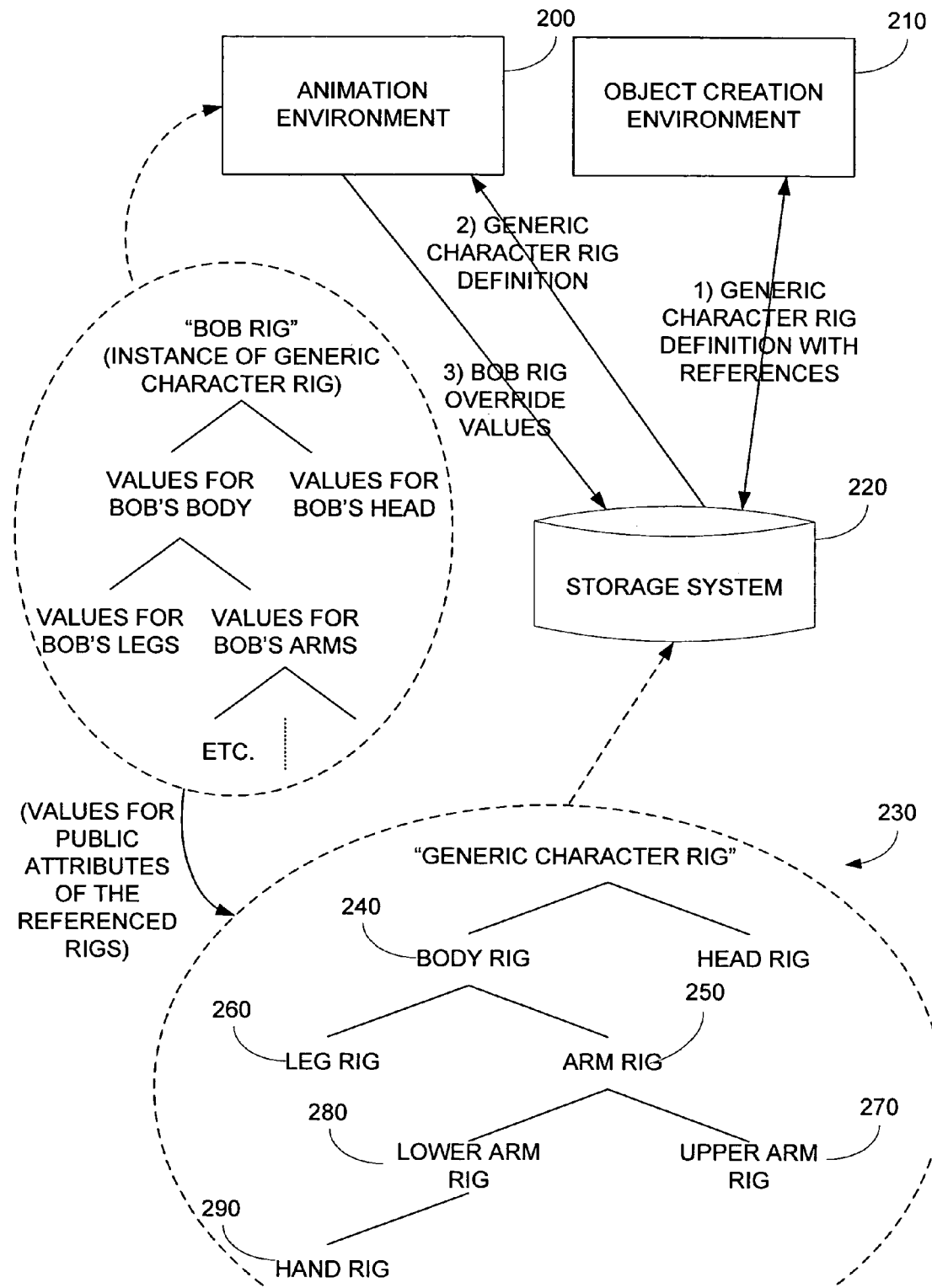
FIG. 2 illustrates a block diagram of an embodiment of the present invention.

FIG. 2 illustrates a block diagram of an embodiment of the present invention. Specifically, FIG. 2 illustrates an animation environment 200, an object creation environment 210, and a storage system 220.

In the present embodiment, object creation environment 210 is an environment that allows users (modellers) to specify object articulation models, including armatures and rigs. Within this environment, users can create models (manually, procedurally, etc.) of objects and specify how the objects articulate with respect to animation variables (Avars). In one specific embodiment, object creation environment 210 is a Pixar proprietary object creation environment known as "Gepetto." In other embodiments, other types of object creation environments can be used.

In the present embodiment, the object models that are created with object creation environment 210 may be used in animation environment 200. For example, as illustrated in FIG. 2, a character "Bob" references a generic character rig 240. Additionally, object models may be referenced by other object models. For example, as illustrated in FIG. 2, a hierarchical object model structure 230 is supported. Structure 230 may represent a bipedal character, for example, that includes a body model (generic character rig) 240, arm model (generic arm rig) 250, leg model (generic leg rig) 260, upper arm model (generic upper arm fig) 270, lower arm model (generic lower arm rig) 280, hand model (generic hand rig) 290, and the like. In this example, hand model 290 may be referenced by lower arm model 280; lower arm model 280 and upper arm model 270 are referenced by arm model 250; and arm model 250 and leg model 260 are referenced by body model 230, and the like.

In embodiments of the present invention, not all objects within the object hierarchy need not be referenced. For example, hand model 290 need not reference finger models, but may physically incorporate descriptions of the finger objects within hand model 290. As another example, arm model 250 may include a reference to hand model 290, but may integrally include the models for the upper arm and the lower arm.

The hierarchical nature for building-up object models is useful because different users (modellers) are typically assigned the tasks of creating the different models. For example, one modeller is assigned the task of creating hand model 290, a different modeller is assigned the task of creating lower arm model 280, and the like. Accordingly, by dividing-up the responsibility for object creation, the object creation process time is greatly reduced.

In the present embodiment, animation environment 200 is an environment that allows users (animators) to manipulate object articulation models, via the animation variables (Avars). In one embodiment, animation environment 200 is a Pixar proprietary animation environment known as "MenV," although in other embodiments, other animation environments could also be adapted. In this embodiment, animation environment 200 allows an animator to manipulate the Avars provided in the object models (generic rigs) and to move the objects with respect to time, i.e. animate an object.

In other embodiments of the present invention, animation environment 200 and object cration environment 210 may be combined into a single integrated environment.

In FIG. 2, storage system 220 may include any organized and repeatable way to access object articulation models. For example, in one embodiment, storage system 220 includes a simple flat-directory structure on local drive or network drive; in other embodiments, storage system 220 may be an asset management system or a database access system tied to a database, or the like. In the present embodiment, storage system 220 receives references to object models from animation environment 200 and object creation environment 210. In return, storage system 220 provides the object model stored therein. The object model will typically be the "latest" version of the object model that is "checked-into" storage system 220.

In embodiments of the present invention, as will be discussed further below, object models that include "child" object models, that are incorporated by reference. More particularly, a copy of the referenced object is opened by animation environment 200 or object creation environment 210, but the referenced objects are not physically stored with the "parent" object. For example, lower arm model 280 does not include a copy of hand model 290, but merely a reference to hand model 290. Additionally, lower arm model may include a set of values or parameters that override public attributes for hand model 290.

Figure 3:
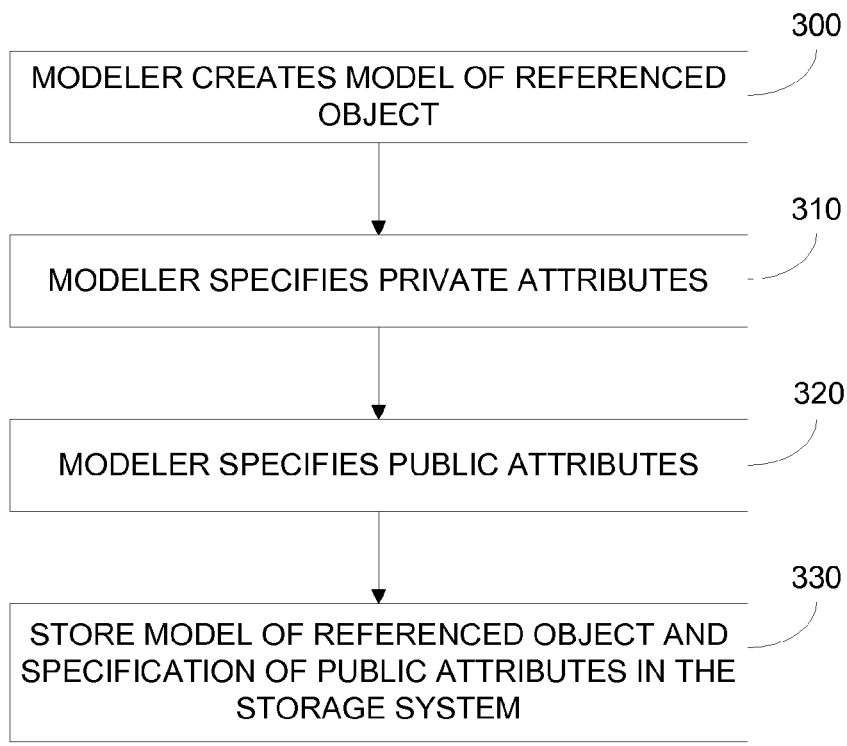
FIG. 3 illustrates a block diagram of a flow chart according to embodiments of the present invention.

FIG. 3 illustrates a block diagram of a flow chart according to embodiments of the present invention. More specifically, FIG. 3 illustrates a process for defining a reusable object model.

Initially, a user creates an object model and specifies one or more object rigs, step 300. In this embodiment, this can be done by a user using object creation environment 210. For example, a user may specify a series of geometric objects, specify how they are connected, specify control points, specify how they articulated in response to the control points, and the like. In the example of a hand object, the modeler may specify the number of fingers, animation variables, how the fingers articulate in response to the animation variables, and the like. In another example of a generic character rig, the user may reference one or more object rigs, such as a body rig, a head rig, and the like.

Next, the user determines which attributes of the object model remain private to the object model, step 310. For instance, the modeler determines which properties of the hand object are locked and cannot be modified by users of the hand object. For example, in the case of a hand, the modeler may specify that the number of fingers on the hand are limited to four; the modeler may specify that the size of a palm is fixed, or the like. In another instance, the modeler may specify that certain public attributes of referenced object rigs remain public, and certain public attributes are no longer public (i.e. are private).

In embodiments of the present invention, allowing a user/modeler to specify some model data as private data is valuable. For example, it preserves the right of the modeler to make subsequent changes to an object model that will not conflict with uses of the object model. For instance, if a hand modeler does not lock the number of fingers, subsequent models that refer to the hand model may specify that a hand has six fingers. However at a later time, if the hand modeler decides that hands should have only five fingers, the updated hand model would conflict with the hand object model having six fingers. Accordingly, by keeping certain data private, the hand modeler can make a change from four fingers to five fingers, without causing conflicts in other models. As other examples, the modeler may specify additional deformers that allow the hand to bend in additional ways; the modeler may specify additional deformers that defines new articulation relationships between the fingers; the modeler may specify additional animation variables (avars); and the like. In the present embodiment, as the referring objects request the updated reference model, the additional functionality of the referenced models is automatically provided to the modeler.

In the present embodiment, the user also determines which attributes of the object model are public for the object model, step 320. The public attributes are attributes that may be specified by other users that reference the object model. For instance, continuing the hand model example, a user/modeler that creates lower arm model 280 may include a reference to hand model 290. In this embodiment, hand model 290 may have a number of public attributes, including length of fingernails, lengths for the different parts of the fingers, length of palm, and the like. In the example of a generic character rig, the user may specify that public attributes of object rigs that are referenced remain public to the user. These attributes may be modified from a default or initial value and overridden by a value specified by the user, as will be illustrated below.

After the object model is specified, the user stores the object model, step 330. In this embodiment, the object model is provided to storage system 220. For example, the user may store one or more files that specify the object model in a pre-determined location within a particular file path. Alternatively, the user may check-in the object model into an asset management system or a database management system. In such cases, the user would provide one or more files that specified the object model, and one or more keywords, or the like that describe the object. In the example above, the user could provide the hand model file generated by object creation environment 210, and describe the file as a "hand rig," "hand model," or the like.

Figure 4A:
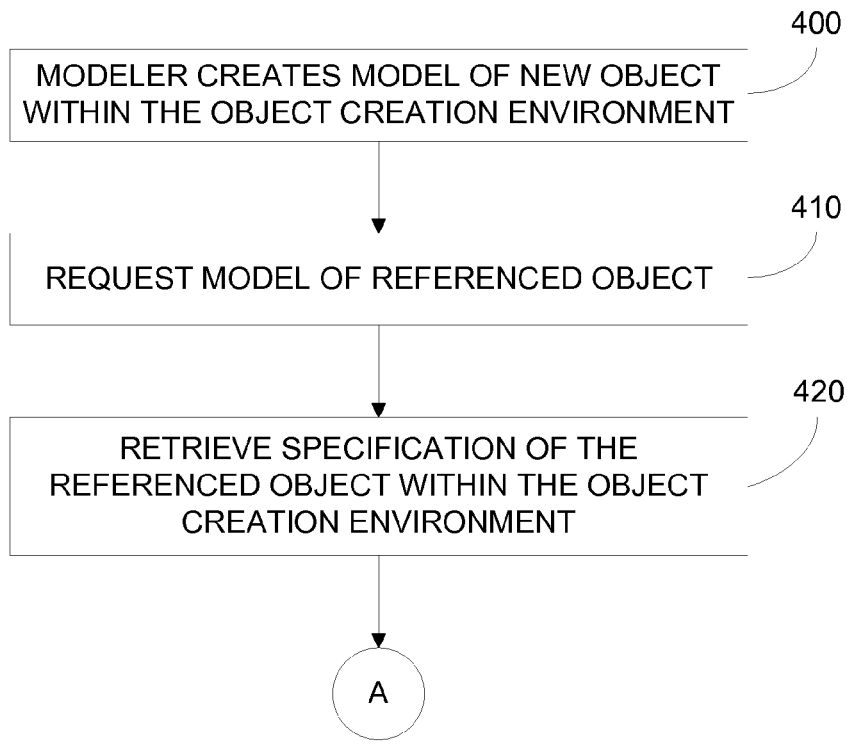
FIGS. 4A-B illustrate another block diagram of a flow chart according to an embodiment of the present invention.
Figure 4B:
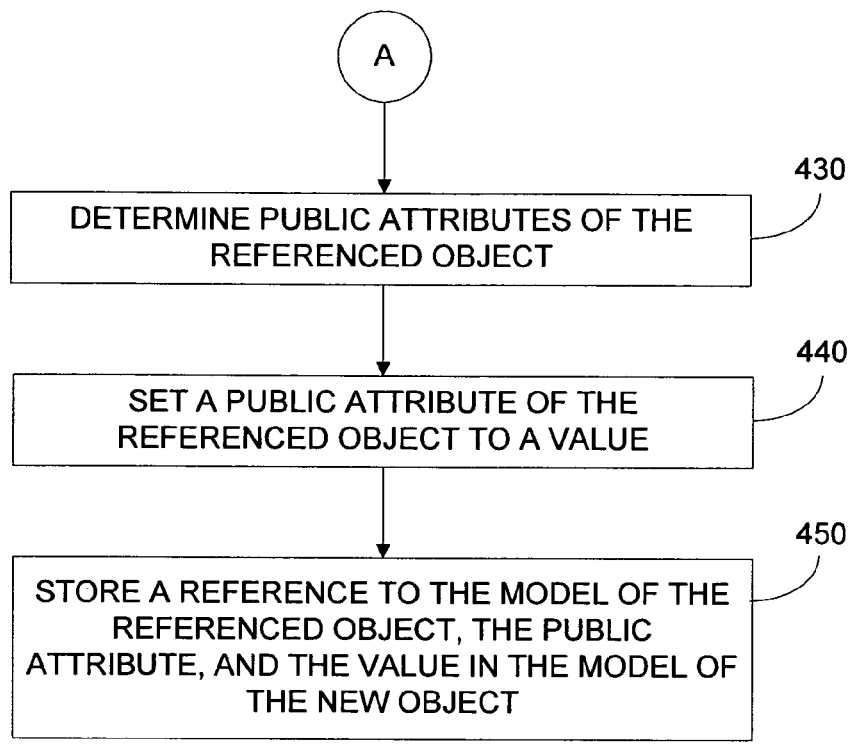

FIGS. 4A-B illustrate another block diagram of a flow chart according to an embodiment of the present invention. More specifically, FIGS. 4A-B illustrate a process for referencing and using a reusable object model.

In this embodiment, initially, a user creates a new object model or opens an existing object model, step 400. This step typically occurs within object creation environment 210, or the like. Next, the user wishes to retrieve an existing object model, thus the user provides the request to storage system 220, step 410. In one embodiment where storage system 220 is a hierarchical flat-file directory structure, the user may specify or navigate down one or more file paths to find the file name associated with the existing object model. In another embodiment where storage system 220 is an asset management system or a database management system, the user may provide one or more key words for initiating a query. In response, to the user's request, storage system 220 retrieves the requested object model within object creation environment 210, step 420.

Next, within object creation environment 210, the user can optionally view the "public" attributes of the existing object model, step 430. More particularly, object creation environment 210 provides the user with the limited ability to customize the referred object model by "overriding" default values. In the present embodiment, the user becomes aware of the public attributes, when the user attempts to modify the existing object model. For example, in the example of an existing hand object, when the user modifies the length of a pointer finger, the width of the palm, and the like, the user is modifying the public attributes. In this case, the "private" attributes of the existing object model, cannot be modified by this user, as was previously described. In embodiments of the present invention, the "private" attributes may or may not be displayed to the user at the same time.

In one embodiment, the user may graphically override values for the public attributes by clicking on one or more control points on the existing object model and moving them, step 440. For example, the user may drag a control point to lengthen a finger of a hand model. In another embodiment, the user may directly specify numeric values, use sliders, or the like to provide values for the public attributes. For example, the user may type-in a value for a thumb width, or the like.

Next, in this embodiment, the values for the public attributes and a reference to the existing object model are stored in one or more files associated with the new object model, step 450. More specifically, as discussed above, the existing object model exposes public attributes that the user may define values for. In this case, the values entered in step 440 are saved along with the new object model. For instance, if the new object model is a lower arm model and the referenced model is a hand model, the new object model may include values for the hand model attributes that are changed by the lower arm modeler.

In other embodiments of the present invention, the user does not specify values for public attributes when creating object models. In such cases, the public attributes of the referenced model become public attributes of the created object.

Additionally, in this embodiment, the new object model includes a reference to the existing object model that was opened in step 420, above. In one example, the reference includes a directory path in network directory. In other examples, the reference includes one or more key words or reference numbers used by an asset management system or database management system to refer to the existing object model.

In this example, the user may also perform the steps described in FIG. 3, above, for the new object model. In this way, the user could also define private attributes and public attributes for the new object model. Using the example above of a lower arm model, the user may specify the length of the forearm and the diameter of the forearm as public attributes. The lower arm model can then be referenced by the arm model.

Additionally, in this embodiment, the user may declare that all attributes of referenced objects that are "public" are now "private." For example, in a lower forearm model that includes a reference to a hand model, all attributes of the hand model can be changed to private. Accordingly, users that reference the lower arm model may not change the geometry of the hand model, or the like. In other embodiments, public attributes of any referenced object, or sub-object can remain public.

An example of an object model that references another object model is illustrated below. In this example, a first object model stored in the file name "GenericCharacterRig.gpto" was created in Pixar's Geppeto environment. Then, a second object model was created with the file name "Bob.gpto" in Pixar's Geppeto environment. While defining the second object model, the modeler/animator referenced the first object model, and defined values for the public attributes. Then, the second object model was saved. A portion of untitled.gpto is as follows:

```
bob.gpto
#geppetto magic v3.6 $RCSfile$ $Revision$
model "bob" {
    networkVersion = 1;
    nextId = 28472;
    boneRoot = 4;
    geomRoot = 3;
    deformRoot = 7;
    modelReference "GenericCharacterRig(105)" {
        modelName = GenericCharacterRig;
        modelFile = GenericCharacterRig/GenericCharacterRig.gpto;
        rootProxies = 106 107 108 ;
        deformerContainerProxy "GenericCharacterRig(108)" {
            publicPath = /GenericCharacterRig;
        }
        geomContainerProxy " GenericCharacterRig (107)" {
            publicPath = / GenericCharacterRig;
        }
        boneProxy "CharacterRoot(106)" {
            publicPath = /CharacterRoot;
        }
        geomObjectProxy "Joints__line(28153)" {
            publicPath = /LHandArmature/IndexArmature/Joints__line;
            global__2.point = 16.3526 –7.67344 0.457567;
        }
    }
...
```

As can be seen in the above example, the first object model is referenced by the following code: "modelReference" GenericCharacterRig (105)" . . . modelFile=GenericCharacterRig/GenericCharacterRig.gpto" Additionally, public attributes of GenericCharacterRig.gpto are specified and set by the following code:"publicPath=LHandArmature/IndexArmature/Joints_line; global__2.point=16.3526–7.67344 0.457567."

In operation, when the animation environment or the object creation environment opens the Bob.gpto file, the latest version of GenericCharacterRig.gpto file is retrieved and the public attributes set in Bob.gpto for GenericCharacterRig.gpto are applied. From the user's perspective, the user is operating upon GenericCharacterRig.gpto, but in reality, the user is merely setting attributes for GenericCharacterRig.gpto within the environment to define the "Bob" character. That is, the local instance of the public attributes are changed by Bob.gpto, but GenericCharacterRig.gpto remains unchanged.

In the present embodiment, each time a model is referenced, the object creation environment retrieves the latest copy of the referenced model stored in the storage system. Thus, for example, in the situation above, when the user initially defines a lower arm model, a hand model specifies four fingers. Later, the hand model is updated to include five fingers. Subsequently, when the user re-opens the lower arm model, the object creation environment references the latest hand model that specifies five fingers. Because a copy of the referenced object is not stored in the new object model, in embodiments, the environment requests the latest "released" or "checked-in" object models. In this embodiment, the referencing functionality is provided to the object creation environment so that it opens the correct reference model, and applies the appropriate set attributes. Emphasis added.

In one embodiment, the user may be automatically notified as to changes in all attributes to referenced models, however in other embodiments, the user may be automatically notified about additions to public attributes, about additions of attributes specified by the referenced object modeler, and even in some embodiments additions to private attributes. As discussed above, if performed correctly, the modeler who defines the referenced model and defines which attributes are public or private, can change private attributes without "breaking" object models that reference the model.

Figure 5A:
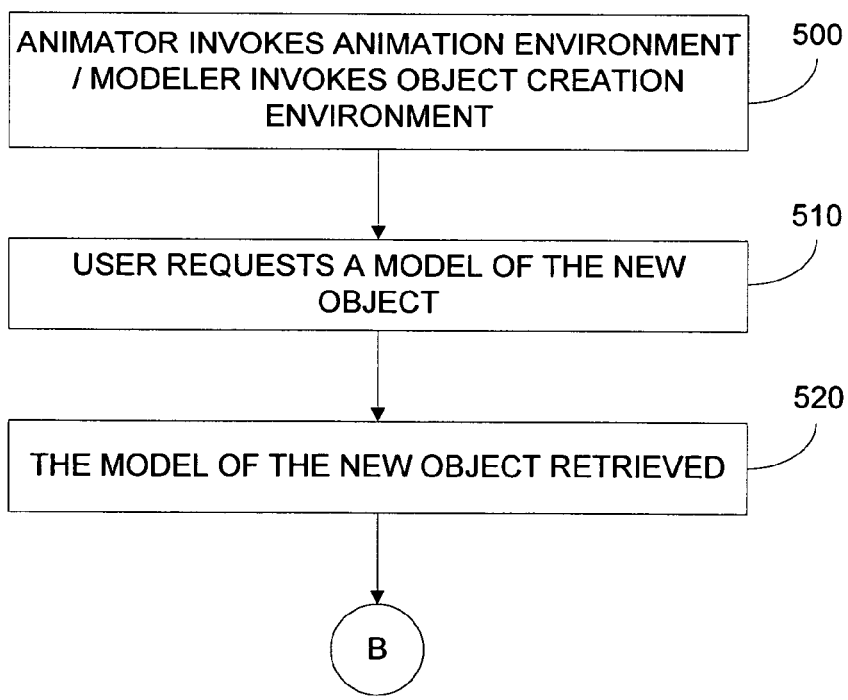
FIGS. 5A-B illustrate a block diagram of a flow process according to an embodiment of the present invention.
Figure 5B:
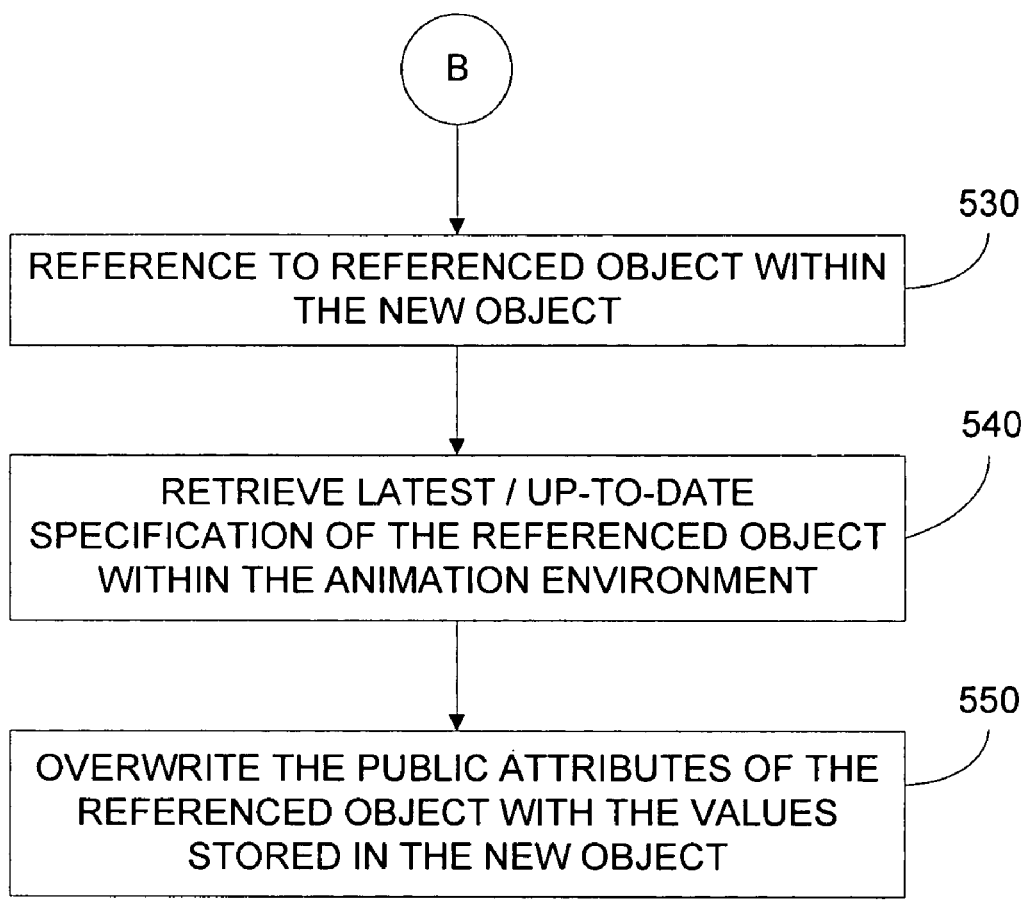

FIG. 5 illustrates a block diagram of a flow process according to an embodiment of the present invention. More specifically, FIG. 5 illustrates a process of a user (animator) using hierarchical object models, as described herein.

Initially, a user (animator) invokes an animation environment, step 500. In the present embodiment, the animation environment is Pixar's MenV environment. In this embodiment, the animation environment allows the user (animator) to modify animation variables (avars) of object models. Based upon the object model, object rigging, and the like, the object model is manipulated in response to the avars.

Next, with the animation environment, the user requests an object model, step 510. In embodiments of the present invention, the object model is requested from a particular directory location, from an asset management system, a database management system, or the like. As an example, the model "bob.gpto" (example above) is requested. In response, the object model is provided and opened in the animation environment, step 520.

In the present embodiment, when the model includes a reference to a referenced model, animation environment requests the referenced model, step 530, and the referenced model is opened in the animation environment, step 540. As discussed above, the referenced model returned from the storage system will typically be the latest version of the referenced model. As an example, for the model "bob.gpto" (example above), GenericCharacterRig.gpto is referenced and retrieved. In some embodiments, particular versions of referenced models may be specified an retrieved. For example, a model may specify version 1.0 of a referenced object, or version 3.2 or the like.

Next, animation environment uses parameters stored in the model and applies them to overwrite the public attributes of the referenced model, step 550. In the present embodiment, a similar process repeats for other referenced objects along the object hierarchy, until all the sub-referenced models are retrieved. For example, in FIG. 2, if the models were all referenced, retrieving body model 240 would include retrieving upper arm model 270, lower arm model 280, hand model 290, and the like, and overriding the respective attributes.

In some embodiments of the present invention, a model is "flattened out" as an optimization. For example, once a model is "finalized," objects that are referenced are pulled into the final model. Accordingly, the final object model will include the object models of referenced objects. Later, when a user such as an animator overrides the public attributes to create an instance of the object ("bob.gpto" is an instance of GenericCharacterRig.gpto), the instance of the object includes the actual object model along with the overridden attributes. In another embodiment, the instance includes the reference to the "flattened" model and the overridden attributes.

In other embodiments, the user may specify how "fardown" the hierarchy the user wants to load into the object creation environment. For example, for sake of simplicity, the user may specify that only a limited number sub-referenced object models may be loaded. In another example, the user may specify only certain branches of the object hierarchy to load. For example, the user (e.g. modeler) may be interested in animating the facial characteristics of a character, accordingly, a leg object referencing an upper thigh object, a lower leg rig, and a foot object, are not loaded. Many other ways to limit the amount of sub-referencing are contemplated in other embodiments.

Many changes or modifications are readily envisioned. In light of the above disclosure, one of ordinary skill in the art would recognize that the concept of referenced objects may be combined and type of storage systems including network drives, relational databases, check-out system, and the like. Further, in other embodiments, users such as animators, modelers, and the like, may define values for public attributes. Further, once such values are defined, the public attributes may then be declared private, thus the attribute cannot be overridden when referenced. In other embodiments, once values are defined for public attributes, they remain public, and thus overridable when referenced. Other combinations of embodiments are also contemplated.

In embodiments of the present invention, it is contemplated that multiple "versions" of referenced objects may be supported. For example, a user may create an object and reference a first version of a hand object. Later a second and a third version of the hand object are created. Then when the user reopens the object, the user is presented with the choice of referencing the first version, the second version, or the third version of the hand object. In other embodiments, the user may compare or be given a list of the changes between the first version and the third version. One the user is satisfied with the third version, the object references the third version. Such embodiments are more suitable for asset management systems and/or database embodiments.

In embodiments where a directory path is used to retrieve object references, the latest version of an object is typically located in the specified location. For example if originally a first version of an object is a filed named hand.gpto, the third version of the object will still be a file named hand.gpto. The older versions of the object may be retrievable from the same directory path, but with different names. In such embodiments therefore, the referenced object will always be the latest version, Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for facilitating the reuse of computer graphics models in a computer system comprising a processor and a memory, the method comprising:

receiving, from a first user in a plurality of users, one or more commands for creating a first computer graphics model in a model creation environment in the processor, wherein the first computer graphics model includes a first plurality of geometric objects containing one or more attributes that are overridable and not overridable, wherein an overridable attribute is a public attribute modifiable and visible by the plurality of users and an attribute that is not overridable is a private attribute not visible to the plurality of users but visible to a model creator of the first computer graphics model, and wherein the first plurality of geometric objects in the first computer graphics model are organized according to a hierarchical structure;

receiving, from the first user, a request to open and create an instance of a second computer graphics model within the first computer graphics model in the processor, wherein the second computer graphics model includes a second plurality of geometric objects containing one or more attributes that are overridable and not overridable, wherein an overridable attribute is a public attribute modifiable and visible by the plurality of users and an attribute that is not overridable is a private attribute not visible to the plurality of users but visible to a model creator of the second computer graphics model and wherein the second computer graphics model is independent of the first computer graphics model;

in response to the request, retrieving a specification of the second computer graphics model from the memory, wherein the specification of the second computer graphics model includes information identifying, for at least one object in the second plurality of geometric objects, one or more attributes of said at least one object of the second plurality of geometric objects that are overridable;

creating the instance of the second computer graphics model within the first computer graphics model in the processor, wherein creating the instance of the second computer graphics model within the first computer graphics model in the processor further comprises geometrically coupling the instance of the second computer graphics model to the hierarchical structure of the first computer graphics model; and for each object of the second plurality of geometric objects in the instance of the second computer graphics model:

determining, based on the specification of the second computer graphics model, attributes of specific geometric objects from the second plurality of geometric objects that are overridable in the processor, and enabling the first user to specify an override value for an attribute of a specific geometric object of the second plurality of geometric objects that is determined to be overridable in the processor; and storing a reference to the second computer graphics model in a specification of the first computer graphics model in the model creation environment such that a copy of the specification of the second computer graphics model is not stored in the specification of the first computer graphics model, and wherein each time the second computer graphics model is referenced the model creation environment opens and creates the latest copy of the second computer graphics model from the memory.

2. The method of claim 1 further comprising:
receiving, from the first user, the override value for an overridable attribute of an object in the instance of the second computer graphics model in the processor;
applying the override value as a current value for the overridable attribute in the context of the first computer graphics model in the processor; and
storing the specification of the first computer graphics model wherein the specification includes the reference to the specification of the second computer graphics model and the override value in the memory.

3. The method of claim 2, wherein the specification of the first computer graphics model is stored as a first file, and wherein the specification of the second computer graphics model is stored as a second file distinct from the first file.

4. The method of claim 2 further comprising:
receiving, from a second user in the plurality of users, one or more commands for creating a third computer graphics model in the model creation environment in the processor, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model;
receiving, from the second user, a request to include an instance of the first computer graphics model in the third computer graphics model in the processor,
wherein said including the instance of the first computer graphics model in the third computer graphics model comprises geometrically coupling the instance of the first computer graphics model to a hierarchical structure of the third computer graphics model; and
in response to the request, retrieving the specification of the first computer graphics model from the memory, the specification of the first computer graphics model including information identifying, for at least one object in the first plurality of geometric objects, one or more attributes of said at least one object of the first plurality of geometric objects that are overridable;
creating the instance of the first computer graphics model within the third computer graphics model in the processor; and
for each object of the first plurality of geometric objects in the instance of the first computer graphics model:
determining, based on the specification of the first computer graphics model, attributes of said each object of the first plurality of geometric objects that are overridable in the processor, and
enabling the second user to override values for the attributes of said each object of the first plurality of geometric objects that are determined to be overridable in the processor; and
storing a reference to the first computer graphics model in a specification of the third computer graphics model in the model creation environment such that a copy of the specification of the first computer graphics model is not stored in the specification of the third computer graphics model, and wherein each time the first computer graphics model is referenced the model creation environment opens and creates the latest copy of the first computer graphics model from the memory.

5. The method of claim 1, wherein the second computer graphics model is created by a second user in the plurality of users distinct from the first user.

6. The method of claim 5 further comprising:
receiving, from the first user, a request to include an instance of a third computer graphics model in the first computer graphics model in the processor, the third computer graphics model having been created by a third user in the plurality of users distinct from the first and second users, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model, and
wherein said including the instance of the third computer graphics model in the first computer graphics model comprises geometrically coupling the instance of the third computer graphics model to the hierarchical structure of the first computer graphics model;
in response to the request, retrieving a specification of the third computer graphics model from the memory, the specification of the third computer graphics model including information identifying, for at least one object in the third plurality of objects, one or more attributes of said at least one object of the third plurality of objects that are overridable;
creating the instance of the third computer graphics model within the first computer graphics model in the processor; and
for each object of the third plurality of geometric objects in the instance of the third computer graphics model:
determining, based on the specification of the third computer graphics model, attributes of said each object of the third plurality of geometric objects that are overridable in the processor, and
enabling the first user to override values for the attributes of said each object of the third plurality of geometric objects that are determined to be overridable in the processor; and
storing a reference to the third computer graphics model in the specification of the first computer graphics model in the model creation environment such that a copy of the specification of the third computer graphics model is not stored in the specification of the first computer graphics model, and wherein each time the third computer graphics model is referenced the model creation environment opens and creates the latest copy of the third computer graphics model from the memory.

7. The method of claim 1, wherein the specification of the second computer graphics model further includes information identifying, for at least one object in the second plurality of geometric objects, one or more attributes of said at least one object of the second plurality of geometric objects that are not overridable, and wherein the method further comprises:
for each object of the second plurality of geometric objects in the instance of the second computer graphics model:
determining, based on the specification of the second computer graphics model, attributes of said each object of the second plurality of geometric objects that are not overridable in the processor, and preventing the first user from overriding values for the attributes of said each object of the second plurality of geometric objects that are determined to be not overridable in the processor.

8. A system for facilitating the reuse of computer graphics models, the system comprising:

a memory configured to store specifications for a plurality of computer graphics models; and a processor in communication with the memory, the processor being configured to:

receive, from a first user in a plurality of users, one or more commands for creating a first computer graphics model in a model creation environment, wherein the first computer graphics model includes a first plurality of geometric objects containing one or more attributes that are overridable and not overridable, wherein an overridable attribute is a public attribute modifiable and visible by the plurality of users and an attribute that is not overridable is a private attribute not visible to the plurality of users but visible to a model creator of the first computer graphics model, and wherein the first plurality of geometric objects in the first computer graphics model are organized according to a hierarchical structure;

receive, from the first user, a request to open and create an instance of a second computer graphics model in the first computer graphics model, wherein the second computer graphics model includes a second plurality of geometric objects containing one or more attributes that are overridable and not overridable, wherein an overridable attribute is a public attribute modifiable and visible by the plurality of users and an attribute that is not overridable is a private attribute not visible to the plurality of users but visible to a model creator of the second computer graphics model, and wherein the second computer graphics model is independent of the first computer graphics model;

in response to the request, retrieve a specification of the second computer graphics model from the memory, the specification of the second computer graphics model including information identifying, for at least one object in the second plurality of geometric objects, one or more attributes of said at least one object in the second plurality of geometric objects that are overridable;

create the instance of the second computer graphics model and include said instance of the second computer graphics model in the first computer graphics model, wherein including the instance of the second computer graphics model in the first computer graphics model comprises geometrically coupling the instance of the second computer graphics model to the hierarchical structure of the first computer graphics model; and for each object of the second plurality of geometric objects in the instance of the second computer graphics model:
determine, based on the specification of the second computer graphics model, attributes of said each object of the second plurality of geometric objects that are overridable, and
enable the first user to override values for the attributes of said each object of the second plurality of geometric objects that are determined to be overridable; and wherein a reference to the second computer graphics model from the memory is stored in a specification of the first computer graphics model such that a copy of the specification of the second computer graphics model is not stored in the specification of the first computer graphics model, and wherein each time the second computer graphics model is referenced, the model creation environment opens and creates the latest copy of the second computer graphics model from memory.

9. The system of claim 8, wherein the processor is further configured to:

receive, from the first user, a new value for an overridable attribute of an object in the instance of the second computer graphics model;

apply the new value as a current value for the overridable attribute in the context of the first computer graphics model; and store the specification of the first computer graphics model in the memory, wherein the specification includes a reference to the specification of the second computer graphics model and the new value.

10. The system of claim 9, wherein the specification of the first computer graphics model is stored as a first file in the memory, and wherein the specification of the second computer graphics model is stored as a second file in the memory distinct from the first file.

11. The system of claim 9, wherein the processing component is further configured to:

receive, from a second user in the plurality of users, one or more commands for creating a third computer graphics model in the model creation environment, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model;

receive, from the second user, a request to include an instance of the first computer graphics model in the third computer graphics model, wherein including the instance of the first computer graphics model in the third computer graphics model comprises geometrically coupling the instance of the first computer graphics model to a hierarchical structure of the third computer graphics model;

in response to the request, retrieve the specification of first computer graphics model from the memory, the specification of the first computer graphics model including information identifying, for at least one object in the first plurality of geometric objects, one or more attributes of said at least one object of the first plurality of geometric objects that are overridable;

create the instance of the first computer graphics model and include said instance in the third computer graphics model; and for each object of the first plurality of geometric objects in the instance of the first computer graphics model:
determine, based on the specification of the first computer graphics model, attributes of said each object of the first plurality of geometric objects that are overridable, and
enable the second user to override values for the attributes of said each object of the first plurality of geometric objects that are determined to be overridable; and store a reference to the first computer graphics model in a specification of the third computer graphics model in the model creation environment such that a copy of the specification of the first computer graphics model is not stored in the specification of the third computer graphics model, and wherein each time the first computer graphics model is referenced the model creation environment opens and creates the latest copy of the first computer graphics model from the memory.

12. The system of claim 8, wherein the second computer graphics model is created by a second user in the plurality of users distinct from the first user.

13. The system of claim 12, wherein the processing component is further configured to:
receive, from the first user, a request to include an instance of a third computer graphics model in the first computer graphics model, the third computer graphics model having been created by a third user in the plurality of users distinct from the first and second users, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model, and wherein including the instance of the third computer graphics model in the first computer graphics model comprises geometrically coupling the instance of the third computer graphics model to the hierarchical structure of the first computer graphics model;
in response to the request, retrieve a specification of the third computer graphics model from the memory, the specification of the third computer graphics model including information identifying, for at least one object in the third plurality of objects, one or more attributes of said at least one object of the third plurality of objects that are overridable;
create the instance of the third computer graphics model and include said instance in the first computer graphics model; and
for each object of the third plurality of geometric objects in the instance of the third computer graphics model:
determine, based on the specification of the third computer graphics model, attributes of said each object of the third plurality of geometric objects that are overridable, and
enable the first user to override values for the attributes of said each object of the third plurality of geometric objects that are determined to be overridable;
store a reference to the third computer graphics model in the specification of the first computer graphics model in the model creation environment such that a copy of the specification of the third computer graphics model is not stored in the specification of the first computer graphics model, and wherein each time the third computer graphics model is referenced the model creation environment opens and creates the latest copy of the third computer graphics model from the memory.

14. The system of claim 8, wherein the specification of the second computer graphics model further includes information identifying, for at least one object in the second plurality of geometric objects, one or more attributes of said at least one object in the second plurality of geometric objects that are not overridable, and wherein the processing component is further configured to:
for each object of the second plurality of geometric objects in the instance of the second computer graphics model:
determine, based on the specification of the second computer graphics model, attributes of said each object of the second plurality of geometric objects that are not overridable, and
prevent the first user from overriding values for the attributes of said each object of the second plurality of geometric objects that are determined to be not overridable.

15. A tangible machine-readable medium having stored thereon a series of computer executable instructions for a computer system which when executed by a processor, cause the processor to execute the instructions for the computer system to provide the steps of:
receive, from a first user in a plurality of users, one or more commands for creating a first computer graphics model in a model creation environment, wherein the first computer graphics model includes a first plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the first computer graphics model, and wherein the first plurality of geometric objects in the first computer graphics model are organized according to a hierarchical structure;
receive, from the first user, a request to open and create an instance of a second computer graphics model in the first computer graphics model, wherein the second computer graphics model includes a second plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the second computer graphics model, and wherein the second computer graphics model is independent of the first computer graphics model;
in response to the request, retrieve a specification of the second computer graphics model, the specification of the second computer graphics model including information identifying, for at least one object in the second plurality of geometric objects, one or more attributes of said at least one object of the second plurality of geometric objects that are overridable;
create the instance of the second computer graphics model and including said instance of the second computer graphics model in the first computer graphics model, wherein said including said instance of the second computer graphics model in the first computer graphics model comprises geometrically coupling the instance of the second computer graphics model to the hierarchical structure of the first computer graphics model; and
for each object in the second plurality of geometric objects in the instance of the second computer graphics model:
determine, based on the specification of the second computer graphics model, attributes of said each object that are overridable, and
enable the first user to override values for the attributes of said each object that are determined to be overridable; and
wherein a reference to the second computer graphics model from memory is stored in a specification of the first computer graphics model such that a copy of the specification of the second computer graphics model is not stored in the specification of the first computer graphics model, and wherein each time the second computer graphics model is referenced, the model creation environment opens and creates the latest copy of the second computer graphics model from the memory.

16. The tangible machine-readable medium of claim 15, wherein the series of instructions further cause the processing component to:
receive, from the first user, a new value for an overridable attribute of an object in the instance of the second computer graphics model;

apply the new value as a current value for the overridable attribute in the context of the first computer graphics model; and store the specification of the first computer graphics model, wherein the specification includes a reference to the specification of the second computer graphics model and the new value.

17. The tangible machine-readable medium of claim 16, wherein the specification of the first computer graphics model is stored as a first file, and wherein the specification of the second computer graphics model is stored as a second file distinct from the first file.

18. The tangible machine-readable medium of claim 16, wherein the set of instructions further cause the processing component to:

receive, from a second user in the plurality of users, one or more commands for creating a third computer graphics model in the model creation environment, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model;

receive, from the second user, a request to include an instance of the first computer graphics model in the third computer graphics model;

in response to the request, retrieve the specification of the first computer graphics model, the specification of the first computer graphics model including information identifying, for at least one object in the first plurality of geometric objects, one or more attributes of said at least one object that are overridable;

create the instance of the first computer graphics model and include said instance of the first computer graphics model in the third computer graphics model, wherein said include the instance of the first computer graphics model in the third computer graphics model comprises geometrically coupling the instance of the first computer graphics model to a hierarchical structure of the third computer graphics model; and for each object of the first plurality of geometric objects in the instance of the first computer graphics model:

determine, based on the specification of the first computer graphics model, attributes of said each object of the first plurality of geometric objects that are overridable, and enable the second user to override values for the attributes of said each object of the first plurality of geometric objects that are determined to be overridable; and store a reference to the first computer graphics model in a specification of the third computer graphics model in the model creation environment such that a copy of the specification of the first computer graphics model is not stored in the specification of the third computer graphics model, and wherein each time the first computer graphics model is referenced the model creation environment opens and creates the latest copy of the first computer graphics model from the memory.

19. The tangible machine-readable medium of claim 15, wherein the second computer graphics model is created by a second user in the plurality of users distinct from the first user.

20. The tangible machine-readable medium of claim 19, wherein the set of instructions further cause the processing component to:

receive, from the first user, a request to include an instance of a third computer graphics model in the first computer graphics model, the third computer graphics model having been created by a third user in the plurality of users distinct from the first and second users, the third computer graphics model including a third plurality of objects containing one or more attributes that are overridable and not overridable, wherein an overridable attribute is a public attribute modifiable and visible by the plurality of users and an attribute that is not overridable is a private attribute not visible to the plurality of users but visible to a model creator of the third computer graphics model;

in response to the request, retrieve a specification of the third computer graphics model, the specification of the third computer graphics model including information identifying, for at least one object in the third plurality of objects, one or more attributes of said at least one object that are overridable;

create the instance of the third computer graphics model and include said instance of the third computer graphics model in the first computer graphics model, wherein said include the instance of the third computer graphics model in the first computer graphics model comprises geometrically coupling the instance of the third computer graphics model to the hierarchical structure of the first computer graphics model; and for each object of the third plurality of geometric objects in the instance of the third computer graphics model:

determine, based on the specification of the third computer graphics model, attributes of said each object of the third plurality of geometric objects that are overridable; and enable the first user to override values for the attributes of said each object of the third plurality of geometric objects that are determined to be overridable; and store a reference to the third computer graphics model in the specification of the first computer graphics model in the model creation environment such that a copy of the specification of the third computer graphics model is not stored in the specification of the first computer graphics model, and wherein each time the third computer graphics model is referenced the model creation environment opens and creates the latest copy of the third computer graphics model from the memory.

21. The tangible machine-readable medium of claim 15, wherein the specification of the second computer graphics model further includes information identifying, for at least one object in the second plurality of geometric objects, one or more attributes of said at least one object in the second plurality of geometric objects that are not overridable, and wherein the method further comprises:

for each object in the instance of the second computer graphics model:

determining, based on the specification of the second computer graphics model, attributes of said each object of the second plurality of geometric objects that are not overridable, and preventing the first user from overriding values for the attributes of said each object of the second plurality of geometric objects that are determined to be not overridable.

\* \* \* \* \*